Feb. 14, 1928.  
O. G. SIMMONS  
1,659,379  
MACHINE FOR GRINDING THE TEETH OF GEARS AND GEAR SHAPED CUTTERS  
Filed July 28, 1926  3 Sheets-Sheet 2

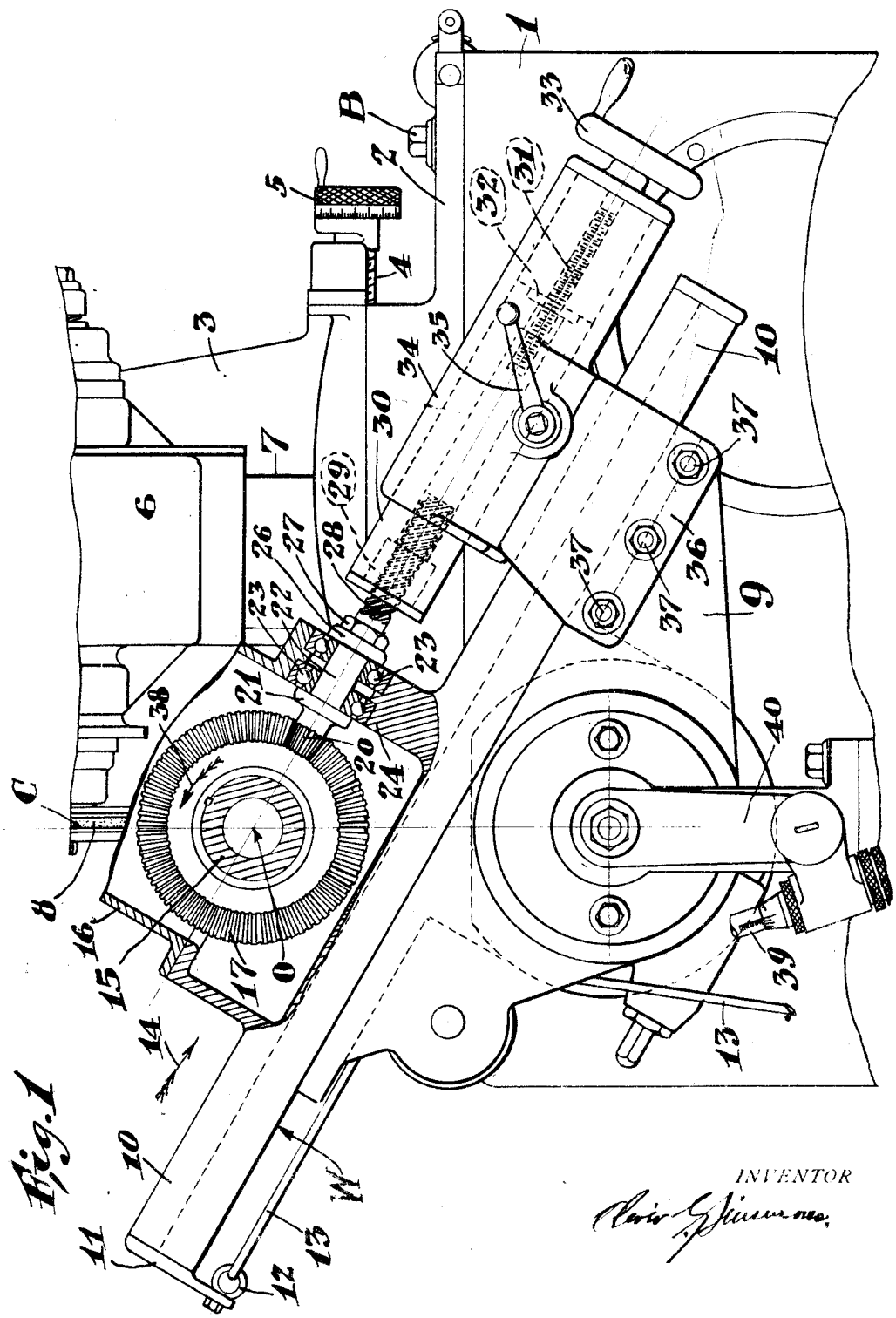

INVENTOR

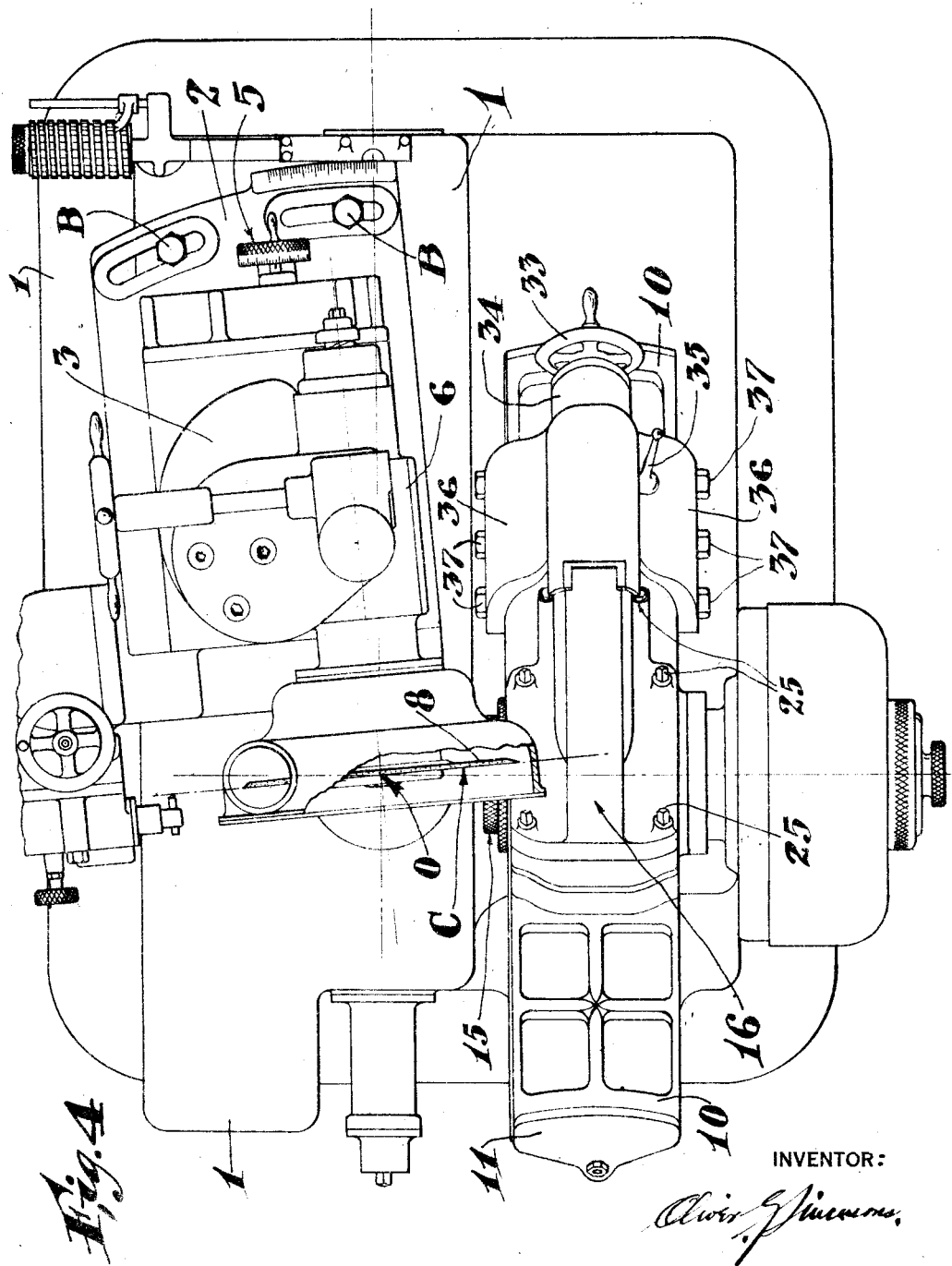

Patented Feb. 14, 1928.

1,659,379

UNITED STATES PATENT OFFICE.

OLIVER G. SIMMONS, OF LAKEWOOD, OHIO.

MACHINE FOR GRINDING THE TEETH OF GEARS AND GEAR-SHAPED CUTTERS.

Application filed July 28, 1926. Serial No. 125,369.

My invention relates to improved means for producing accurately correlated relative movements between a cutting element and a work spindle, angularly about the axis of the work spindle and linearly in a direction transverse to said axis in order to generate a curvature of predetermined form on the teeth of gears and gear shaped cutters. The invention as disclosed in this specification and as illustrated in the drawings to be referred to later, is shown as applied to my machine described and illustrated in my application for Letters Patent of the United States for method of and machine for grinding the teeth of gears and gear shaper cutters, Serial No. 98,791, filed March 31st 1926.

In a machine for grinding the teeth of gears and gear shaped cutters and all kindred articles of manufacture where the greatest precision is required, it is essential that the relatively linear and angular movements of the work spindle with respect to the cutting element be correlated, positive and of precise magnitude.

The main object of the present invention, therefore, is to provide correlated positive mechanical means of precise magnitude for machines adapted to generate the curved teeth of gears, gear shaped cutters and all kindred articles of manufacture. A further object of the invention is to provide the work spindle carried by the slide with a gear adapted to mesh with a pinion gear provided with a shaft which is journalled in a portion of the slide, the other end portion of said gear pinion shaft being provided with threads adapting same to engage a threaded portion in the spindle of the tail-stock member, to cause said slide to move in a rectilinear path with the oscillating motion of said spindle; said rotary motion and said rectilinear motion being correlated one with the other, so that as the work spindle is revolved with a uniform speed or with a non-uniform speed, the rectilinear movement of the slide will be correlated and uniform or non-uniform as the work spindle rotary movement is uniform or non-uniform.

A still further object of the invention is to provide the pinion shaft screw thread with a multiple number of threads and a lead to enable gear grinding machines to operate on the describing generating principle of action or on the molding generating principle of action to produce true involute curves on the working faces of the teeth of gears, gear shaped cutters or the like, the lead of which involute curve will be greater than that of the lead of the screw threaded portion of the pinion gear shaft.

Another object of the invention resides in the means to move the slide in a rectilinear path independent of the means previously referred to as being correlated with the rotary motion of the work spindle.

Other objects of the invention comprise in an apparatus of the character set forth, a cutting element, a slide carrying a work spindle journalled in and disposed transversely thereof, a gear fixedly secured to said work spindle, a shaft journalled in said slide provided with a pinion engaging said gear, said shaft being provided with a threaded portion engaging a nut fixedly secured to a tail-stock spindle adjustable axially thereof, a tail-stock fixedly secured to a swivel member, said tail-stock having journalled therein said tail-stock spindle, and means to adjust said tail-stock spindle axially thereof and fixedly secure same in any predetermined position, means to angularly adjust swivel member upon which is mounted the aforesaid slide to an angle equal to the complemental pressure angle with respect to the face of the cutting element, means to angularly adjust said cutting element about a vertical center line to the angle of the helix of the work, a weight exerting a force to the slide in one direction, and means to cause an oscillating movement to said work spindle whereby said slide is caused to reciprocate uniformly or non-uniformly as the oscillating movement to the work spindle is uniform or non-uniform.

With the above and other objects in view the invention may be said to comprise broadly the embodiment of the means attained by the structure illustrated in the accompanying drawings hereinafter described and particularly set forth in the appended claims, together with such variations and modifications thereof as will be apparent to those skilled in the art to which the invention appertains. Reference should be had to the accompanying drawings forming a part of this specification.

Fig. 1, is a front view in elevation of a portion of a well-known gear and gear shaped cutter grinding machine, partly in fragmentary section, showing the present invention and its application to that machine.

Fig. 4 is a plan view of Fig. 1.

Figure 3:
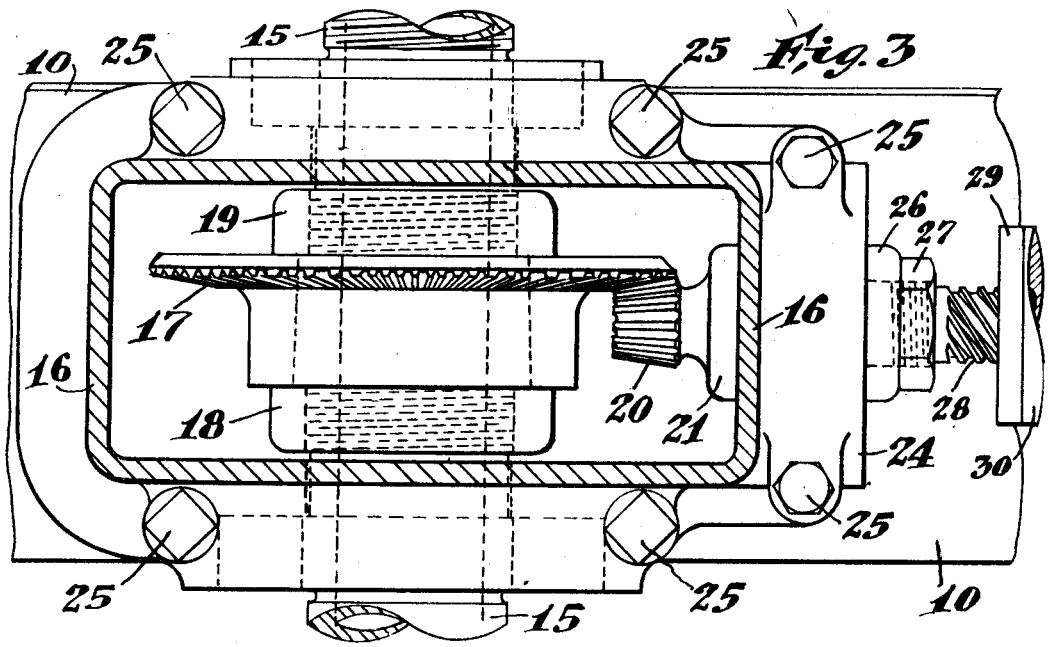
Fig. 3, is a plan view of Fig. 2 partly in section through the cover showing the relation between the work spindle and the driving gear mounted on said spindle.
Figure 2:
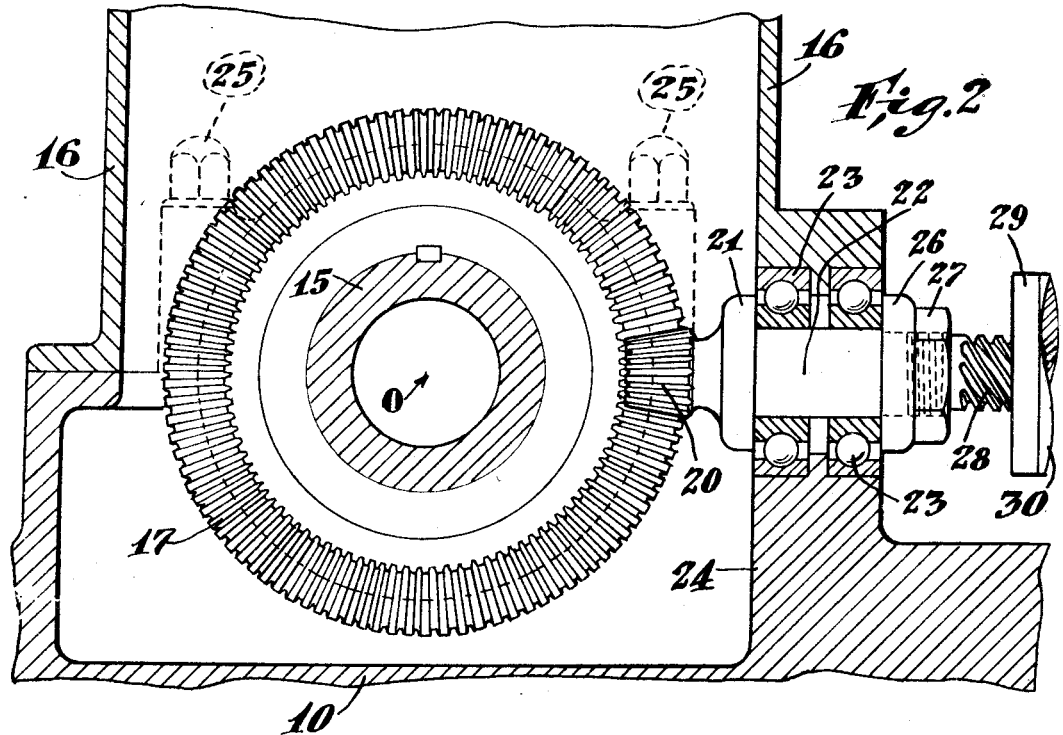
Fig. 2, is an enlarged view in sectional elevation of the present invention.

Numeral 1 indicates the bed of the machine upon which is mounted upright swivel base 2. The upright 3, is adapted to engage the slide on swivel base 2, through the medium of V-ways, not shown, by means of the screw 4 having threaded engagement with swivel base 2, the hand-wheel 5 being secured to said screw 4. The adjustable vertical slide 6 is adapted to engage V-ways 7 on the upright 3, which the adjustable vertical slide 6 engages. The cutting element 8, which may be an abrasive wheel or a milling cutter, is carried by a spindle in the slide 6. The cutting element 8 may be rotated by any suitable means. Swivel member 9 is adjustably mounted on the bearing carried by the bed 1. Slide 10 engages V-ways on swivel member 9 and is adapted to move in a rectilinear path thereof.

The plate 11 is secured to the end portion of the slide 10 to which is fixedly secured the eye-bolt 12, through which a cable 13 is passed and secured. The other end of the cable 13 has a weight attached which causes the slide 10 to exert force in the direction of the arrow 14.

The work-sleeve spindle 15 is journalled in a portion of the slide 10, and covered by the dust cover 16 to prevent ingress of dirt or other foreign matter. The gear 17 (preferably bevel gear) is fixedly secured to the work-sleeve spindle 15 and held in place by means of the nuts 18 and 19 which have threaded engagement with said work-sleeve spindle, see Fig. 3. The pinion gear 20 (preferably pinion bevel) has tooth engagement with said gear 17. The pinion gear is provided with the shoulder 21 and the shaft portion 22, adapting same to be journalled in the ball bearings 23 which are housed in an upper portion 24 of the slide 10 and secured in said position by means of a portion of the dust cover 16, the bolts 25 being used to secure dust cover 16 to slide 10, making a unitary part of said slide 10 and dust cover 16.

The ball bearings 23 are known commercially as radio thrust bearings, so that the shoulder 21 of the shaft 22 and the washer 26 and nut 27, having threaded engagement with said shaft 22, provide very suitable means for arranging pinion gear shaft in said slide 10 and eliminate all possibility of end-play. The end portion 28 of the pinion shaft is provided with the threads shown. These threads engage the flange nut 29 which is fixedly secured to the tail-stock spindle 30. Tail-stock spindle 30 is adapted to be moved longitudinally of its axis in tail-stock 34, by means of the screw 31 having threaded engagement with the flange nut 32, whereby spindle 30 is moved as the screw 31 is turned by hand, through the medium of the hand-wheel 33. The slide 10 is moved to the right or left to suit conditions in practice and this adjustment is independent of other rectilinear movement of the slide 10.

The spindle 30 of the tail-stock 34 is fixedly secured in any predetermined position by means of the lever 35 which is used commercially in connection with tail-stocks and is old in the art and therefore well understood. The tail-stock 34 at the lower portion 36 thereof is fixedly secured to the swivel 9 by means of the cap-screws 37.

Bed 1, swivel base 2, upright 3, slide 6, cutting element 8, swivel 9, slide 10, cable 13, tail-stock spindle 30, with adjustable screw 31, nut 32, hand-wheel 33, tail-stock 34, lower portion 36 and its connection to swivel 9, through the medium of bolts 37, form a part of the subject matter of my application for patent Serial No. 98,791 previously referred to and are therefore no part of the present invention.

If now, the work-sleeve spindle 15 is given rotary motion, uniform or non-uniform, the gear 17 will cause the pinion gear 20 to rotate. The rotation of the pinion gear 20 will cause shaft 22 and threaded portion 28 to rotate uniformly with said uniform or non-uniform rotary motion of the gear 17, since the threaded portion 28 of the pinion shaft has threaded engagement with the tail-stock spindle 30, the slide 10 will be caused to move in a rectilinear path on the swivel 9 and the rectilinear motion of said slide 10 with respect to the rotary motion of the work-sleeve spindle 15, will depend upon the number of teeth in gears 17 and 20 and the lead of the screw threads 28. It follows therefore that if a uniform rotary motion is given to gear 17, slide 10 will move uniformly in a rectilinear path determined by the ratio between the elements 17, 20 and 28. If, however, non-uniform motion is given to gear 17, the motion of slide 10 will be non-uniform, but nevertheless correlated therewith and in direct ratio of the elements 17, 20 and 28. One end portion of the cable 13 being secured to the end portion of the slide 10, having a weight attached to the other end of said cable 13, will cause slide 10 to move in the direction of the arrow 14 to a position of rest determined by any lost motion between the nut 29 and the screw threads 28 and the gears 17 and 20, thus when force is applied to oscillate the work-sleeve spindle 15, slide 10 is actuated to move to lift the weight at the end of cable 13 and when the motion of the work-sleeve spindle 15 is reversed to the opposite direction the weight continues to exert its force so that the lost motion, if any exists, between the gears and the screw and the nut will always be in the same direction, so that in the functional operation of the means herein disclosed in a machine of the character set forth, it will make no difference what the magnitude of the lost motion is between the screw thrusts 28, the nut 29, pinion gear 20 and gear 17. The weight on the end of the cable 13 exerting force always in one direction will keep the slide 10 to its lower-most position to the right of the person viewing the drawing, Fig. 1, this pressure being constant will cause the work spindle 15 to exert a constant rotative force in the direction of the arrow 38, and this force will be overcome by the positive mechanical means applied to the work-sleeve spindle 15, through the medium of the members of the connecting rod 39 and the bell-crank 40 in an application of the present invention to the machine referred to.

If now, the machine is operating and the work spindle oscillating and the slide reciprocating as described, it is quite obvious that an additional independent rectilinear movement will be given to the slide 10 if the hand-wheel 33 is rotated. The object of giving this independent movement to the slide is fully set forth in Letters Patent pending in the application herein referred to. It is thought, therefore, that it will only be necessary to state that this movement is necessary when grinding gear shaper cutters to enable the flanks of the teeth to be controlled with respect to fullness of the flank of the gear shaper cutter teeth or non-fullness as the case may be.

This flank fullness is controlled by the relative movement of slide 10 with respect to the fixed position of the cutting element 8. If no flank fullness is required it is only necessary to allow the slide 10 which carries the work spindle 15 to move further to the right of the person viewing the drawing Fig. 1. If, however, flank fullness is required it is merely necessary to cause slide 10 to reverse its movement and return to its former position before the center O of the work spindle 15 coincides with the cutting face C of the cutting element 8. The position of the axis O, therefore, to the cutting face C is controlled by the position of the tail-stock spindle 30. In grinding gear shaper cutters which may have helically arranged teeth it is necessary to swivel the cutting element 8 about a vertical axis coincident with the cutting face C. This is provided for in the present invention by means of the swivel upright base 2. This may be swivelled on bed 1 in a plane perpendicular to the plane of the drawing, Fig. 1, to any desired angle corresponding to the helical angle of the teeth of the gear shaper cutter, plus any additional amount desired for clearance to said teeth and when so swivelled, said swivel base 2 may be locked in that position by means of the bolts B passing through an elongated slot in said swivel base 2 and having threaded engagement with bed 1.

It was previously stated that invention herein disclosed is applicable to grinding machines set forth, wherein a swivel member 9 is disposed to the pressure angle desired in the gear when operating on the moulding generating principle of action, to the end that the cutting face C of the cutting element 8 with the sliding ways W of the slide 10, form an angle equal to the complemental pressure angle desired in the cutters or gears. It is only necessary, therefore, where the pitch diameter remains fixed, to obtain a different pressure angle in the gear or cutter by merely disposing swivel 9 to that angle of pressure. This is accomplished by any suitable means, as for example, means illustrated and described in pending application previously referred to.

Having thus described my invention, I claim:

1. In a machine of the character set forth, a work spindle mounted in a slide, a gear wheel secured to said work spindle, a shaft journalled in said slide provided with a pinion engaging said gear, said pinion shaft being provided with a threaded portion having threaded engagement with a member connected to a fixed member, and means to oscillate said work spindle, whereby said slide is given a uniform or non-uniform rectilinear movement.

2. In a machine of the character set forth, a slide, a work spindle mounted on the slide, means for oscillating said work spindle, and means for simultaneously reciprocating said slide in a direction transverse to said spindle comprising a shaft mounted on the slide and geared to said spindle, said shaft extending in the direction of movement of the slide and having a threaded portion, and a fixed member having a part in threaded engagement with the threaded portion of said shaft.

3. In a machine of the character set forth, a slide and a work spindle journalled therein, a gear fixedly secured to said work spindle, a pinion provided with a shaft journalled in said slide and meshing with said gear, a threaded portion of said shaft, a member engaging said threads, said member being adjustable with respect to the member carrying the slide.

4. In an apparatus of the character set forth, a cutting element, a slide carrying a work spindle disposed at an angle to said cutting element, a gear fixedly secured to said work spindle, a shaft journalled in said slide provided with a pinion engaging said gear, said shaft being provided with a threaded portion engaging a member fixed with respect to said slide.

5. In a machine of the character set forth, a swivel member, a slide mounted thereon, a cable fastened to one end of the slide and carrying a weight at the other end, said weight exerting force to the slide in one direction, a cutting element, a work spindle mounted in said slide, a gear wheel fixedly secured to said spindle, a pinion meshing with said gear, provided with a pinion shaft journalled in said slide, a threaded portion of said pinion shaft, a member engaging the threads of said pinion shaft, means to oscillate said work spindle whereby the force exerted by said weight is always in one direction to eliminate play between the gear and pinion and the member engaging the threads of said pinion shaft.

6. In a machine of the character set forth, a swivel member, a slide mounted thereon, a cable fastened to one end of the slide, said cable carrying a weight on the other end, said weight exerting force in one direction, a cutting element, a work spindle mounted in said slide, a gear wheel fixedly secured to said spindle, a pinion meshing with said gear provided with a pinion shaft journalled in said slide, a threaded portion of said pinion shaft, a member engaging the threads of said pinion shaft and means to adjust said member with respect to said cutting element.

7. In an apparatus of the character set forth, a cutting element, a reciprocating slide having a work spindle journaled therein, means for oscillating said spindle and simultaneously reciprocating said slide including a slide actuating shaft journaled in the slide and geared to said spindle, and means to angularly adjust the slide with respect to the cutting element.

8. In an apparatus of the character set forth, a cutting element, a reciprocating slide carrying a work spindle disposed at an angle to said cutting element, a gear fixedly secured to said work spindle, a shaft journalled in said slide provided with a pinion engaging said gear, said slide being provided with means to angularly adjust same with respect to the cutting element.

9. In an apparatus of the character set forth, a cutting element, a reciprocating slide carrying a work spindle, a gear fixedly secured to said work spindle, a shaft journalled in said slide provided with a pinion engaging said gear, said shaft being provided with a threaded portion engaging a member fixed with respect to said slide and means to angularly adjust said slide and said fixed member with respect to the cutting element.

10. In an apparatus of the character set forth, a cutting element, a slide carrying a work spindle, a gear fixedly secured to said work spindle, a shaft journalled in said slide provided with a pinion engaging said gear, said shaft being provided with a threaded portion engaging an adjustable member fixed with respect to said slide and means to angularly adjust said slide and said member fixed with respect to said slide to said cutting element.

11. In a machine of the character set forth, a cutting element, a slide carrying a work spindle angularly adjustable to said cutting element, a gear fixedly secured to said work spindle, a shaft journalled in said slide provided with a pinion engaging said gear, said shaft being provided with a threaded portion engaging a movable member carried by a fixed member, and means to adjust said fixed member to the angular position of the slide.

12. In a machine of the character set forth, a cutting element, a work spindle journalled in a reciprocating slide transversely thereof, a gear fixedly secured to said work spindle, a shaft journalled in said slide provided with a pinion engaging said gear, said cutting element being angularly adjustable with respect to said transversely disposed work spindle.

13. In an apparatus of the character set forth, a cutting element, a work spindle journalled transversely in a reciprocating slide, a gear fixedly secured to said work spindle, a shaft journalled in said slide provided with a pinion engaging said gear, and means to angularly adjust said cutting element with respect to said work spindle.

14. In an apparatus of the character set forth, a cutting element adapted to rotate about a given axis, a work spindle journalled transversely in a reciprocating slide and adapted to oscillate on its axis, a gear fixedly secured to said work spindle, a shaft journalled in said slide provided with a pinion engaging said gear, said pinion shaft having a threaded portion engaging an adjustable member and means to angularly adjust said axes to a given angle.

15. In a machine of the character set forth, a cutting element, a slide carrying a work spindle, a gear fixedly secured to said work spindle, a shaft journalled in said slide provided with a pinion engaging said gear, means to angularly adjust said slide with respect to said cutting element to a given complemental pressure angle, and means to angularly adjust said cutting element with respect to said slide to a given angle corresponding to the helical angle of the teeth of the work secured to said work spindle.

16. In a machine for grinding gear shaper cutters and kindred articles of manufacture, a cutting element, a slide, a work spindle journalled in and transversely of said slide, a gear fixedly secured to said work spindle, a shaft journalled in said slide provided with a pinion engaging said gear, said shaft being provided with a threaded portion engaging a member fixed with respect to said slide, means to angularly adjust said slide with respect to the cutting element to a given pressure angle, means to angularly adjust said cutting element to the angle of the helix of the work mounted on the work spindle, means to adjust the slide independently of the angular adjustment of same and independent of the angular adjustment of the cutting element to produce a flank fullness in helically disposed teeth of gear shaper cutters and kindred articles of manufacture.

17. In a machine of the character set forth, a cutting element, a slide carrying a work spindle disposed transversely thereof, a gear fixedly secured to said work spindle, a shaft journalled in said slide provided with a pinion engaging said gear, said shaft being provided with a threaded portion engaging a nut fixedly secured to a movable spindle, a tail-stock fixedly secured to a swivel member carrying the aforesaid spindle, and means to move said spindle axially thereof to produce flank fullness or non-flank fullness in gear shaper cutters and kindred articles of manufacture.

18. In an apparatus of the character set forth, a cutting element, a slide carrying a work spindle journalled in and disposed transversely thereof, a gear fixedly secured to said work spindle, a shaft journalled in said slide provided with a pinion engaging said gear, said shaft being provided with a threaded portion engaging a nut fixedly secured to a tail-stock spindle adjustable axially thereof, a tail-stock fixedly secured to a swivel member, said tail-stock having journalled therein said tail-stock spindle, and means to adjust said tail-stock spindle axially thereof and fixedly secure same in any predetermined position, means to angularly adjust said swivel member upon which is mounted the aforesaid slide to an angle equal to the complemental pressure angle with respect to the face of the cutting element, means to angularly adjust said cutting element about a vertical center line to the angle of the helix of the work, a weight exerting a force to the slide in one direction, and means to cause an oscillating movement to said work spindle whereby said slide is caused to reciprocate uniformly or non-uniformly as the oscillating movement to the work spindle is uniform or non-uniform.

19. In a machine of the character set forth, a slide, a work spindle mounted on the slide, means for oscillating said work spindle and means for simultaneously reciprocating said slide in a direction transverse to said spindle comprising a shaft mounted on the slide and geared to said spindle, said shaft extending in the direction of movement of the slide, a fixed member and means interposed between said fixed member and shaft to actuate said slide upon a rotative movement of the shaft.

20. In a machine of the character described, relatively movable supports, a work spindle on one support, a cutting element on the other support, said work spindle and cutting element being mounted for movements relative one to the other, angularly about the axis of the spindle and linearly in a direction transverse to said axis, and means for producing and correlating said angular and transverse movements including a shaft journaled on the work spindle support at an angle to the work spindle and geared to said spindle, a member fixed with respect to the cutting element support, and means interposed between said shaft and member for causing relative linear movement between said spindle and cutting element upon a rotative movement of said shaft.

21. In a machine of the character described, relatively movable supports, a work spindle on one support, a cutting element on the other support, said work spindle and cutting element being mounted for movements relative one to the other, angularly about the axis of the spindle and linearly in a direction transverse to said axis, and means for producing and correlating said angular and transverse movements including a shaft extending at an angle to said work spindle and having a thrust bearing on the work spindle support, intermeshing bevel gears fixed to said spindle and shaft, a member fixed with respect to the cutting element support and means interposed between said shaft and member for causing relative linear movement between said spindle and cutting element upon a rotative movement of said shaft.

22. In a gear generating machine, a work slide, a support for the slide having a guideway for the slide, a work spindle journaled on the slide and extending transversely thereof, a cutting element operating in a plane transverse to the path of movement of the slide and fixed with respect to the slide support, means for oscillating the work spindle, and means for imparting reciprocating movements to the slide at rates proportional to the angular movements of the spindle comprising a bevel gear on the spindle, a thrust bearing on the slide, a shaft journaled in said bearing and extending transversely of the work spindle, said shaft having a bevel pinion at one end, meshing with said gear and a threaded portion at the opposite end, a tailstock fixed on said slide support and a nut carried by said tailstock and receiving the threaded end of said shaft.

23. In an apparatus of the character set-forth, a cutting element, a slide carrying a work spindle adjustably disposed to said cutting element, a gear fixedly secured to said work spindle, a shaft journalled in said slide provided with a pinion engaging said gear, said shaft being provided with a threaded portion engaging a member fixed with respect to said slide, the lead of the threaded portion of the shaft, together with the number of teeth in the pinion and gear, being of such ratio as to cause the slide to move, during one reciprocation, a linear measure of distance corresponding to the measure of the perimeter of a given pitch circle, adapting said cutting element to generate involute curves having a lead the measure of the magnitude of which will be greater than the measure of the lead of the threads of the shaft aforesaid.

Signed this 26th day of July, 1926.

OLIVER G. SIMMONS.